Patented Sept. 24, 1935

2,015,065

UNITED STATES PATENT OFFICE 2,015,065

PROCESS FOR THE SYNTHESIS OF ORGANIC COMPOUNDS

Gilbert B. Carpenter, Wilmington, Del., assignor to E. I. du Pont de Nemours & Company, Wilmington, Del., a corporation of Delaware No Drawing. Application June 20, 1931, Serial No. 545,857

9 Claims. (Cl. 260—116)

This invention relates to the synthesis of organic compounds and particularly to the preparation of higher aliphatic acids by the interaction of olefines, carbon monoxide and steam.

Aliphatic acids of a higher order such as propionic acid, butyric acids, etc., have been heretofore prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the many important uses to which acids of this type are adaptable, many of which uses have not been exploited extensively due to their present high cost, it is obvious that a process for their preparation from raw materials, which are, at present, readily available and which will be even more readily available in the near future, will be of far reaching importance in this art.

It is an object of the present invention to provide a process for the synthesis of aliphatic acids from simpler and less costly raw materials than have previously been used. Other objects and advantages will hereinafter appear.

I have found that aliphatic acids of a higher order can be produced by the reaction of steam, carbon monoxide, and an olefinic hydrocarbon; that is an aliphatic hydrocarbon containing a double bond,—for example, the olefines ethylene, propylene, butylene, etc., or a diolefine such as butadiene, isoprene, etc. These hydrocarbons may be represented generically by the formula  in which R, R₁, R₂, and R₃ represent hydrogen (H) or an aliphatic radical. The acid-forming reaction of the hydrocarbons with steam and carbon monoxide apparently proceeds in accordance with the equation—

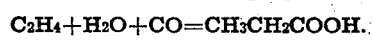

Thus ethylene, for example, reacts with steam and carbon monoxide to form propionic acid:

$$C_2H_4 + H_2O + CO = CH_3CH_2COOH.$$

Propylene and butylene similarly yield butyric and valeric acids, respectively.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water gas, producer gas, etc., by liquefaction or other methods, and should likewise for the best results be relatively pure, it being particularly desirable to avoid the presence therein of sulphur compounds and metallic carbonyls.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 5% by volume of the total reactants have been employed with good results.

While the process may be effected at ordinary pressures I have found that the use of pressures in excess of atmospheric, say from 25 to 900 atmospheres, is desirable. The desired reaction proceeds over a wide range of temperatures although the optimum temperature varies with specific cases, depending inter alia upon the hydrocarbon being used. Generally the desired reaction can be obtained at from 100° to 500° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 200° to 400° C.

The following example will illustrate one method of practising the invention, although the invention is not limited to the example.

*Example.*—A gas mixture consisting of 90% by volume of carbon monoxide, 2% ethylene, and 8% steam, was passed, at a pressure of 700 atmospheres, a temperature of 375° C., and a space velocity of 3000, over a catalyst consisting of phosphoric acid supported on charcoal. (The space velocity is the volume of gas passed over a unit volume of catalyst per hour.) The catalyst was prepared by heating activated charcoal, soaking it in dilute phosphoric acid for several hours and drying it at 125° C.

Activated charcoal alone may be used as a catalyst for the reaction, although the combination of phosphoric acid and charcoal is preferred on account of its considerably greater activity.

Other catalysts that may be employed in the process include generally inorganic acids that are not volatilized at the temperature of the synthesis, e. g. acids of phosphorus, arsenic, and boron, as well as acid salts of inorganic acids. The halides of copper, zinc, and aluminum may also be used.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese, or nickel.

Various changes may be made in the method hereinbefore described without departing from the invention or sacrificing the advantages thereof.

I claim:

1. In a process for the preparation of aliphatic carboxylic acids from olefinic hydrocarbons, steam, and carbon monoxide, the step which comprises effecting the reaction in the presence of an inert gas.

2. In a process for the preparation of aliphatic carboxylic acids from an olefine, steam, and carbon monoxide, the step which comprises effecting the reaction in the presence of an inert gas.

3. In a process for the preparation of propionic acid from ethylene, steam, and carbon monoxide, the step which comprises, effecting the reaction in the presence of an inert gas.

4. In the process of preparing aliphatic carboxylic acid from propylene, steam, and carbon monoxide, the step which comprises effecting the reaction in the presence of an inert gas.

5. In a process for the preparation of aliphatic carboxylic acid from butylene, steam, and carbon monoxide, the step which comprises effecting the reaction in the presence of an inert gas.

6. In a process for the preparation of aliphatic carboxylic acids from an olefinic hydrocarbon, steam, and carbon monoxide, the step which comprises effecting the reaction in the presence of a catalyst non-volatile under temperature of the reaction selected from the group consisting of an acid of phosphorus, boron, and arsenic.

7. In a process for the preparation of aliphatic carboxylic acids from olefinic hydrocarbons, steam, and carbon monoxide, the step which comprises effecting the reaction in the presence of a catalyst non-volatile under temperature of the reaction selected from the group consisting of an acid of phosphorus, boron, and arsenic, supported on activated charcoal.

8. A process of reacting an olefinic hydrocarbon, steam, and carbon monoxide and thereby producing an aliphatic carboxylic acid, characterized in that the reaction is effected in the presence of a phosphoric acid catalyst supported on activated charcoal.

9. A process of reacting ethylene, steam and carbon monoxide and thereby producing propionic acid, characterized in that the reaction is effected in the presence of a phosphoric acid catalyst supported on activated charcoal.

GILBERT B. CARPENTER.